United States Patent [19]
Sauerhoefer

[11] Patent Number: 5,989,679
[45] Date of Patent: *Nov. 23, 1999

[54] STRONG, DIMENSIONALLY STABLE OBJECT

[75] Inventor: Marc Raymond Sauerhoefer, Chicopee, Mass.

[73] Assignee: United Technologies Corporation, East Hartford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/701,411

[22] Filed: Aug. 22, 1996

Related U.S. Application Data

[62] Division of application No. 08/490,278, Jun. 14, 1995, abandoned.

[51] Int. Cl.$^6$ .............................. B29C 35/08; B22C 9/02
[52] U.S. Cl. .......................... 428/116; 264/401; 264/221
[58] Field of Search .................................... 264/401, 221; 428/116

[56] References Cited

U.S. PATENT DOCUMENTS

| | | | |
|---|---|---|---|
| 4,844,144 | 7/1989 | Murphy et al. | 164/35 |
| 5,109,589 | 5/1992 | Cramer et al. | 29/527.4 |
| 5,256,340 | 10/1993 | Allison et al. | 264/22 |
| 5,418,112 | 5/1995 | Mirle et al. | 430/269 |
| 5,435,902 | 7/1995 | André, Sr. | 264/401 X |
| 5,439,622 | 8/1995 | Pennisi et al. | 264/22 |
| 5,468,886 | 11/1995 | Steinmann et al. | 549/549 |
| 5,482,659 | 1/1996 | Sauerhoefer | 264/401 |
| 5,545,367 | 8/1996 | Bae et al. | 264/401 |
| 5,603,797 | 2/1997 | Thomas et al. | 264/401 X |
| 5,616,293 | 4/1997 | Ashtiani-Zarandi et al. | 264/401 |

FOREIGN PATENT DOCUMENTS

| | | |
|---|---|---|
| 0484183 | 5/1992 | European Pat. Off. . |
| 0590957 | 4/1994 | European Pat. Off. . |
| 0649691 | 4/1995 | European Pat. Off. . |

OTHER PUBLICATIONS

European Search Report for European Patent Application No. EP 96 30 4367.
Article entitled "Rapid Stereolithography Molds" by Jim Tobin, Chris Schneider, Bob Pennisi and Steve Hunt, vol. 15, p. 38 of Motorola Inc. Technical Developments, published May 15, 1992.
The Selective Laser Sintering Process Third Generation Desk Top Manufacturing, DTM Corporation, Austin, Texas.
Selective Laser Sintering: Understanding and Applying the Technology, Scott Hill, DTM Corporation, Presented to the First National Conference on Desktop Manufacturing, Cambridge, Massachusetts.
Rapid Prototyping Systems, the Solider Solution for Prototyping and Manufacturing, Cubital.
Preliminary Product Data, Cibatool® SL XB 5170, 3D Systems Inc., P/N 18840–S03–01 Rev. A, Jun., 1993.
Cibatool® SL 5180, 3D Systems, Ciba–Geigy Corporation.
SLS Model 125, DTM Corporation, Austin, Texas.
Stereolithography 1993: Epoxy Resins, Improved Accuracy & Investment Casting, Dr. P. Jacobs, 3D Systems, Inc., Valencia, California.
Rapid Prototyping and Manufacturing Conference 94, Apr. 26–28, 1994, Dearborn, MI, New Resin Developments for Stereolithography, Epoxy Resin: Accuracy, Dimensional Stability and Mechanical Properties, Electroless Plating of SL–Parts, Dr. Adrian Schulthess, et al., Ciba–Geigy Corporation.
"Low Cost Jigs Fixtures & Gages for Limited Production", William E. Boyes, Society of Manufacturing Engineers, Chapter 10, "Plastic Tool Construction", pp. 159–184.
Application Brief, "Nylon Material Properties", DTM Corporation.

*Primary Examiner*—Daniel Zirker
*Attorney, Agent, or Firm*—John E. Boyd, Esq.; Whitman Breed Abbott & Morgan LLP

[57] ABSTRACT

A strong, dimensionally stable object, such as a tooling fixture, is produced by providing a three dimensional, rapid free form fabricated object having a hollow internal cavity and flowing a strengthening material, such as an epoxy resin, into the internal cavity.

48 Claims, 1 Drawing Sheet

STRONG, DIMENSIONALLY STABLE OBJECT

This is a division of application Ser. No. 08/490,278 filed on Jun. 14, 1995, now abandoned.

TECHNICAL FIELD

The present invention relates to a strong, dimensionally stable object.

BACKGROUND INFORMATION

Rapid free-form fabrication, commonly referred to as rapid prototyping, is an additive process often used to produce three dimensional objects, such as gas turbine engine component models. A useful rapid prototyping process is known as stereolithography. In general, stereolithography refers to a method of rapidly building up an object in a layer by layer fashion. In this process, an ultraviolet laser beam selectively scans a portion of a bath of photocurable liquid resin to produce a predetermined pattern. Upon contact with the laser beam, the resin rapidly polymerizes (solidifies). This process enables rapid and accurate fabrication of three dimensional objects which would otherwise be produced by lengthy molding and machining processes.

Solid or hollow three dimensional objects may be produced by stereolithography. For example, QuickCast™ by 3D Systems, Inc. may be used to produce investment casting patterns with a honeycomb-like internal structure. This build style facilitates drainage of uncured resin from within the internal cavities of the pattern. The internal voids in the pattern permit the pattern to collapse upon itself as it expands against a mold during investment casting processing, as opposed to exerting excessive force against the mold walls and causing cracking.

Although stereolithographically produced objects are useful, their direct use is limited by the physical properties inherent in the resins suitable for stereolithography processing. Resins suitable for this type of processing are photocurable liquids and objects produced with such resins often experience creep effects or long term dimensional instability. Thus, although these objects have great use as investment castings patterns or as non-functional prototypes, their use in other applications such as tooling fixtures is limited.

Conventional tooling fixtures are usually metal which makes them both costly and difficult to form. In addition, the design of tooling fixtures is dependent upon component size and shape. Thus, the part specific nature and the complexity of tooling fixtures makes them both time consuming and costly to manufacture. It is also not economical to manufacture these metallic tooling fixtures in small lots, which is often necessary.

Accordingly, there exists a need for a strong, dimensionally stable object, especially a tooling fixture, as well as a method for producing such an object.

DISCLOSURE OF THE INVENTION

According to the present invention, a method of producing a strong, dimensionally stable object is disclosed. One aspect of the invention includes providing a three dimensional, rapid free form fabricated object having a hollow internal cavity and flowing a strengthening material into the internal cavity.

Another aspect of the invention includes providing a stereolithographically produced object having a plurality of interconnected, internal cavities and flowing an epoxy resin into the internal cavities.

Another aspect of the invention includes a strong, dimensionally stable article including a rapid free form fabricated structure of desirable geometry having a plurality of internal, interconnected cavities, wherein the structure is made of a photocurable liquid. A strengthening material, such as an epoxy resin, is located within the internal cavities.

Yet another aspect of the invention includes stereolithographically producing an object in a configuration opposite that of a desired article geometry, the object having a hollow internal portion. This aspect further includes injecting strengthening material into the hollow portion and then removing the stereolithography material to expose the article of desired geometry.

An advantage of the present invention is that articles, such as tooling fixtures, made in accordance with the present invention weigh less than traditional metal tooling fixtures. As a result, capital tooling investments are less.

Yet another advantage of the present invention is that articles made in accordance with the present invention exhibit high strength, dimensional stability and durability. Articles made in accordance with the present invention may operate as functional objects and not merely non-functional prototypes. The present invention thus increases the application potential of rapid prototyping technology into non-traditional areas, such as tooling fixture production.

BEST MODE FOR CARRYING OUT THE INVENTION

According to the present invention, a method of producing a strong, dimensionally stable object of complex geometry is disclosed. First, a three dimensional, rapid free form fabricated object is provided. Rapid free form fabrication is an additive process in which an object of desired geometry is accurately built up, typically in a layer by layer fashion. Known rapid free form fabrication processes include, but are not limited to, previously mentioned stereolithography by 3D Systems, Inc. and Cubital's Solider system. In general, Cubital's Solider process utilizes a photo-mask (image of layer to be produced) which is positioned over photocurable liquid (resin). Selective solidification of the layer occurs upon application of an ultraviolet light through the mask. Unsolidified resin drains, leaving cavities which are then filled with melted wax. Upon solidification of the wax, the layer is milled into a smooth surface and a new layer of the photocurable liquid is positioned on the surface. The solidified wax provides support for model production. Another mask is created and the process is repeated. Upon completion of production, the wax is removed to expose the model.

The object may comprise a plurality of interconnected, internal cavities or may be hollow. Preferably, the object is made by stereolithography because of its ability to rapidly and accurately fabricate objects of complex geometry with internal, interconnected cavities. For example, 3D Systems, Inc. QuickCast™ build style allows the production of three dimensional objects having a honeycomb-like internal structure.

Figure 1:
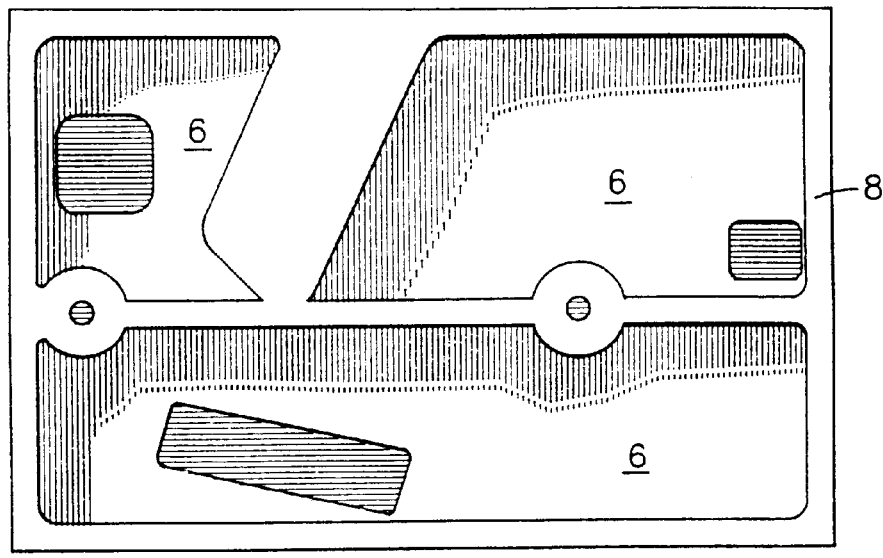
FIG. 1 schematically shows a bottom view of a stereolithographically produced tooling fixture.

The desired internal and external object geometry depends upon the usage of the object and is based upon a computer model. For example, it may be desirable to produce an object with a hollow portion on the bottom surface for tooling fixture usage, as shown in FIG. 1. Preferably, the hollow portion is located in large volume areas as shown at 6 to minimize the amount of strengthening material subsequently injected into the object while not adversely affecting dimensionally stability, accuracy and functionality. Minimizing the amount of material injected into the object reduces the amount of heat released as the strengthening material cures. This is desirable to avoid thermal distortion of the object. Thin wall structures, as shown at 8, further reduce build time. Thickness of the wall structure is dependent on overall object size. In general, the cross sectional thickness of the object is controlled to limit the volume of injected material without compromising the physical and mechanical properties of the object. An advantage of this structure is that secondary reinforcement with alternate material of desirable properties may be employed to rapidly fill external voids, if desirable. For example, if wear resistance is desired, then external voids could be subsequently filled with a wear resistant material.

Preferably, a plurality of drainage ports and/or hose fittings are conventionally built into the object during stereolithography processing. These openings will facilitate internal resin removal. Internal resin removal may be accomplished by that which is disclosed in U.S. Pat. No. 5,482,659 filed on Dec. 22, 1994, entitled, *Method of Post Processing Stereolithographically Produced Objects*, assigned to the Assignee of the present invention. The object may then be post cured by exposure to ultraviolet light.

According to the present invention, the openings are capped except preferably one which is intentionally left uncapped to facilitate the filling process. Strengthening material, compatible with the object material, is then flowed into the object. The strengthening material may comprise a variety of materials, such as ceramics or epoxies. The strengthening material may include additional particulates of alternate material including, but not limited to, metallic particulates, fiber particulates or ceramic particulates. Preferably the material is an epoxy resin due to its high dimensional stability, good machinability and nonreactivity with other materials. The epoxy resin may include, but is not limited to, traditional tooling materials such as CIBA-GEIGY REN® epoxies. The particular epoxy resin (or mixtures thereof) employed is dependent upon the desired properties and subsequent usage of the object. However, other lower viscosity materials, including but not limited to urethanes, may be employed for less demanding physical and mechanical applications such as design evaluation.

The epoxy resins may be conventionally mixed and then degassed within a vacuum chamber prior to filling. Most chemically cured, multi-component (resin/hardener), epoxy systems are exothermic and thus the amount of heat dissipated increases with volume. Thus, minimizing the volume of material injected, as noted above, reduces heat dissipation and avoids thermal distortion of the object.

The selected strengthening material is injected into the object at a pressure less than about 100 psi. Preferably, the injection pressure is less than about 50 psi. Regulation of the pressure below about 50 psi enables the object's dimensional integrity to be maintained. Excessive injection pressure can create a large back pressure and can cause the internal honeycomb-like structure to separate from the stereolithographically formed walls of the object. This may lead to dimensional inaccuracies or wall fractures.

As in thermoplastic injection molding, flow control is essential. Rapid filling may result in an incomplete fill. For example, isolated air pockets which cannot be vented may occur. This porosity diminishes structural integrity. Thus, preferably the rate of injection is between about 0.5 $in^3$/min and about 50 $in^3$/min and most preferably between about 1 $in^3$/min and about 10 $in^3$/min.

Pressure injection at low viscosity can also lead to isolated air pockets. Higher viscosity injection serves to restrict evolving gases from the object and produce a densely packed structure. The viscosity of the injected material may be between about 1000 centipoise and about 30,000 centipoise. Most preferably, the viscosity is between about 4300 centipoise and about 20,000 centipoise. The flow of material should be observed during the filling process and pin holes installed where required to redirect the flow into any observed areas of stagnation. When the object is observed to be full, all pin hole vents are capped to prevent leakage.

Since chemical curing of epoxy materials is exothermic, excess heat may be removed by forced air convection or refrigeration to prevent thermal distortion of the object. After curing, the object is ready for direct use as a functional test model or as a tool. However, depending on the material and intended use, post thermal processing may be necessary to achieve elevated temperature capabilities. For example, this may be desirable for a welding fixture used to accurately locate sheet metal brackets which are subsequently welded together while located on the fixture. Since the fixture will be exposed to a high temperature welding flame, it must have high temperature capabilities.

Another embodiment of the invention includes subsequently pressure packing the filled object to achieve a more dense structure. This pressure packing occurs prior to complete solidification of the initially injected strengthening material (preferably epoxy resin). In this embodiment additional strengthening material is exposed to the filled object at an opening on the object by means such as a funnel or hose. The funnel or hose is filled with material and the entire structure is disposed in a pressure vessel so that uniform pressure may be exerted on the walls of the object, as well as on the material in the funnel or hose Preferably, the pressure of the vessel is between about 60 psi and about 100 psi. Pressure packing should take only minutes and results in a less porous object. Porosity may be further reduced by exposing the internal area of the object to a vacuum prior to initially injecting any strengthening material into the object.

In yet another embodiment of the present invention, open face molding may be employed. In this embodiment, a surface portion of the stereolithographically produced object is removed and desired strengthening material is poured into the object. Low viscosity materials, including but not limited to, CIBA-GEIGY RP 3269 (aluminum-filled material) are best suited for this embodiment. Solidification time is dependent on the particular material employed.

An apparatus suitable for injecting the strengthening material includes a pneumatic pump dispenser having a cartridge in which the material is disposed. Similarly, an automated mixing and dispensing system such as Liquid Control's Posiload® Pump may be employed.

The present invention will now be described by way of example which is meant to be exemplary rather than limiting.

EXAMPLE

A stereolithography pattern having a plurality of interconnected, internal cavities was conventionally produced using the QuickCast™ build style. The pattern was built with a plurality of resin drain/purge holes including a hose fitting. All openings were capped except one hose fitting. Epoxy resin, CIBA-GEIGY RP 3262, was employed and entrained air was degassed within a bell jar vacuum chamber. The epoxy resin was transferred into a pneumatic dispenser cartridge and the cartridge was installed into the pneumatic pump dispenser. A short hose segment was attached to the hose fitting on the pattern for sealing. The nozzle on the dispenser was inserted through the hose segment and into the hose fitting. The trigger on the dispenser was depressed and the epoxy resin was injected at about 50 psi and about 10 in$^3$/min. The flow of epoxy resin into the internal cavities was observed and pin holes were installed at several locations to redirect the flow into areas of stagnation. After the pattern was observed to be full, all pin holes were capped to prevent leakage and subtle back pressure was applied by slowly withdrawing and filling the hose fitting and hose segment with epoxy. Since chemical curing of the epoxy is exothermic, excess heat was removed from the pattern by refrigeration to prevent thermal distortion of the pattern. After about 24 hours, the pattern was ready for direct use as a tube assembly fixture.

An advantage of the present invention is that tooling fixtures made in accordance with the present invention weigh less than traditional metal tooling fixtures. As a result, capital tooling investments are less.

Another advantage of the present invention is the ability to economically and rapidly produce complex shaped objects.

Yet another advantage of the present invention is that tooling fixtures made in accordance with the present invention exhibit high strength, dimensional stability and durability. Fixtures made in accordance with the present invention may operate as functional objects and not merely non-functional prototypes. For example, the present invention enables the production of dimensionally stable and durable tooling fixtures or checking gauges which can be used in a production environment. Thus, the present invention significantly increases the application potential of rapid prototyping technology into nontraditional areas.

Figure 2:
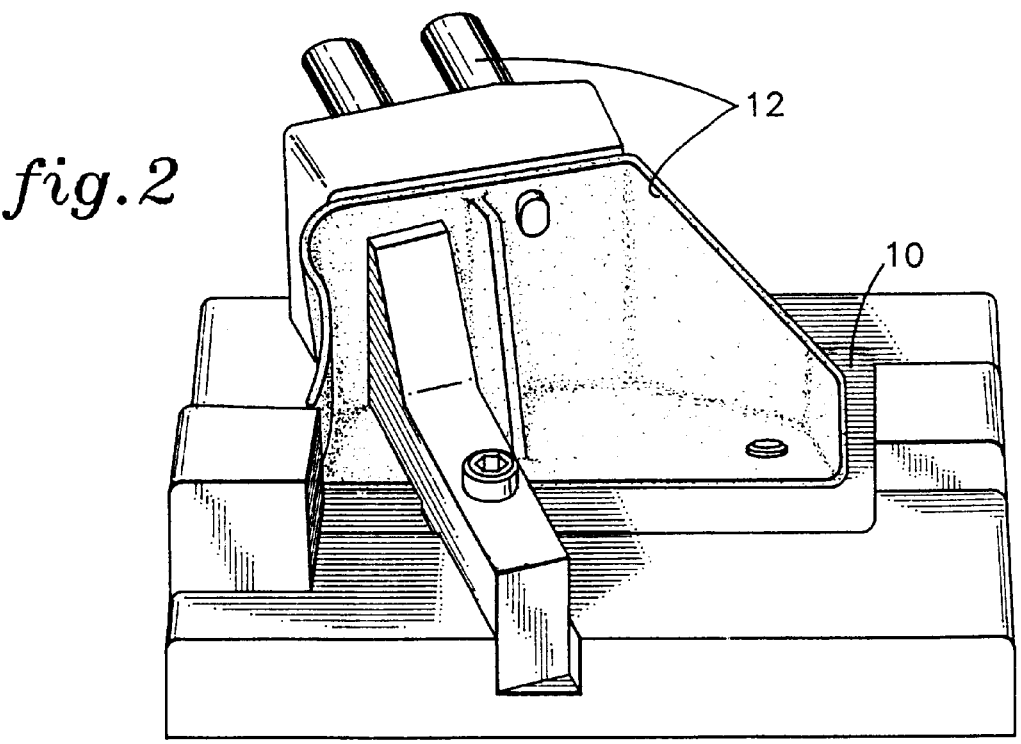
FIG. 2 schematically shows a strong, dimensionally stable tooling fixture having a metallic part located on the tooling fixture.

Another advantage of the present invention is that a dimensionally accurate object having about 80 volume percent of internal, alternate material exhibiting desirable mechanical and physical properties may be produced. The outer skin of the object exhibiting the stereolithography photocurable resin may be removed to expose the underlying material 10, as shown in FIG. 2 which is a schematic drawing of a strong, dimensionally stable tooling fixture made in accordance with the present invention. A portion of the outer skin material (stereolithography photocurable resin) is removed at 10 to expose an underlying wear resistant resin which was filled into the object. Thus, metal component 12 may be located on the tooling fixture without damaging the fixture.

If the intended application of the object also requires the entire outer surface of the object to be of a particular quality, such as wear resistant checking gauge applications, then the outer surface of the filled object may be coated with a material exhibiting the desired characteristics. Coating is conventional and includes spraying, dipping or brushing.

Alternatively, a rapid free form fabricated pattern opposite that of the desired geometry may be produced. Stereolithography is a preferred process for producing a dimensionally accurate object of complex shape. Once this "mold" is produced, it is conventionally cured and the desired strengthening material may be injected into the mold. After subsequent solidification of the strengthening material, the mold material may be cracked off to expose the resulting object of desired geometry. This embodiment of the present invention results in a dimensionally accurate object of 100 volume percent desired material.

Although the present invention has been shown and described with respect to detailed embodiments thereof, it should be understood by those skilled in the art that various changes in form and detail may be made without departing from the spirit and scope of the invention.

I claim:

1. An article comprising a stereolithographically produced structure of desirable geometry having a plurality of internal, interconnected cavities, said structure being made of a photocurable liquid; and a strengthening material comprising an epoxy resin within the cavities, said strengthening material having a viscosity of between about 1,000 centipoise and about 30,000 centipoise and being injected within the cavities at an injection pressure of less than about 100 psi at a rate of injection between about 0.5 in$^3$/min and about 50 in$^3$/min wherein the structure is cured to produce a strong, densely packed, dimensionally stable article of accurate dimension.

2. The article of claim 1 wherein a portion of the photocurable liquid is removed to expose the epoxy resin.

3. The article of claim 1 wherein the article is a checking gauge.

4. The article of claim 1 wherein the article further comprises an outer coating.

5. The article of claim 4 wherein the coating is a wear resistant material.

6. The article of claim 1 wherein the article is pressure packed.

7. A tooling fixture comprising:
    (a) a three dimensional, stereolithographically produced object shaped as a tooling fixture; and
    (b) strengthening material comprising an epoxy resin, said strengthening material having a viscosity of between about 1,000 centipoise and about 30,000 centipoise injected into said object at an injection pressure of less than about 100 psi at a rate of injection between about 0.5 in$^3$/min and about 50 in$^3$/min wherein said object is cured to produce a strong, densely packed, dimensionally stable tooling fixture of accurate dimension.

8. The tooling fixture of claim 7 wherein said tooling fixture further comprises an external void which is filled with a reinforcing material.

9. The tooling fixture of claim 8 wherein the reinforcing material is a wear resistant material.

10. A three-dimensional rapid free form fabricated article comprising: (a) a stereolithographically produced structure having a plurality of internal, interconnected cavities, said structure being made of a photocurable liquid; and (b) a strengthening material within the cavities of said structure, wherein the structure is cured to produce a strong, dimensionally stable article.

11. The article of claim 10, wherein said strengthening material comprises epoxy resin.

12. The article of claim 10, wherein said strengthening material has a viscosity of between about 1,000 centipoise and about 30,000 centipoise.

13. The article of claim 10, wherein said article is a checking gauge.

14. The article of claim 10 wherein said article further comprises an outer coating.

15. The article of claim 14, wherein said coating is a wear resistant material.

16. The article of claim 10, said strengthening material being injected within the cavities at an injection pressure of less than 100 psi at a rate of injection between about 0.5 in$^3$/min and about 50 in$^3$/min.

17. The article of claim 16, wherein the rate of injection is between about 1 in$^3$/min and about 10 in$^3$/min.

18. The article of claim 10, said strengthening material being injected within the cavities at an injection pressure of less than 50 psi at a rate of injection between about 0.5 in$^3$/min and about 50 in$^3$/min.

19. The article of claim 18, wherein the rate of injection is between about 1 in$^3$/min and about 10 in$^3$/min.

20. The article of claim 10, wherein said plurality of internal, interconnected cavities form a honeycomb-like internal structure.

21. The article of claim 10, wherein said stereolithographically produced structure and said strengthening material comprise different materials.

22. A three-dimensional rapid free form fabricated article produced by a method comprising the steps of: (a) providing a three dimensional, rapid free form fabricated structure having a hollow external cavity and (b) flowing a strengthening material into the cavity, thereby forming a strong, dimensionally stable article.

23. The article of claim 22, wherein said strengthening material comprises epoxy resin.

24. The article of claim 22, wherein said strengthening material has a viscosity of between about 1,000 centipoise and about 30,000 centipoise.

25. The article of claim 22, wherein said article further comprises an outer coating.

26. The article of claim 25, wherein said coating is a wear resistant material.

27. The article of claim 22, wherein said hollow external cavity comprises a plurality of interconnected cavities.

28. The article of claim 27, wherein said plurality of interconnected cavities form a honeycomb-like structure.

29. The article of claim 22, wherein said three dimensional, rapid free form fabricated structure and said strengthening material comprise different materials.

30. A three-dimensional rapid free form fabricated article produced by a method comprising the steps of: (a) providing a three dimensional, rapid free form fabricated structure having a hollow internal cavity and (b) flowing a strengthening material into the cavity, thereby forming a strong, dimensionally stable article.

31. The article of claim 30, wherein said strengthening material comprises epoxy resin.

32. The article of claim 30, wherein said strengthening material has a viscosity of between about 1,000 centipoise and about 30,000 centipoise.

33. The article of claim 30, wherein said article further comprises an outer coating.

34. The article of claim 33, wherein said coating is a wear resistant material.

35. The article of claim 30, wherein said hollow external cavity comprises a plurality of interconnected cavities.

36. The article of claim 35, wherein said plurality of interconnected cavities form a honeycomb-like internal structure.

37. The article of claim 30, wherein said rapid free form fabricated structure is stereolithographically produced.

38. The article of claim 30, further comprising the step of removing the rapid free form fabricated structure.

39. The article of claim 30, wherein said three dimensional, rapid free form fabricated structure and said strengthening material comprise different materials.

40. A three-dimensional article produced by a method comprising the steps of: (a) stereolithographically producing a three dimensional, rapid free form fabricated object having a hollow internal cavity and (b) flowing a strengthening material into the cavity, thereby forming a strong, dimensionally stable article.

41. The article of claim 40, wherein said strengthening material comprises epoxy resin.

42. The article of claim 40, wherein said strengthening material has a viscosity of between about 1,000 centipoise and about 30,000 centipoise.

43. The article of claim 40, wherein said article further comprises an outer coating.

44. The article of claim 43, wherein said coating is a wear resistant material.

45. The article of claim 44, wherein said plurality of interconnected cavities form a honeycomb-like internal structure.

46. The article of claim 40, wherein said hollow external cavity comprises a plurality of interconnected cavities.

47. The article of claim 40, further comprising the step of removing the stereolithographically produced structure.

48. The article of claim 40, wherein said strengthening material has a viscosity of between about 4300 centipoise and about 20,000 centipoise.

* * * * *